(12) United States Patent
Kern et al.

(10) Patent No.: US 11,139,999 B2
(45) Date of Patent: Oct. 5, 2021

(54) METHOD AND APPARATUS FOR PROCESSING SIGNALS FROM MESSAGES ON AT LEAST TWO DATA BUSES, PARTICULARLY CAN BUSES; PREFERABLY IN A VEHICLE; AND SYSTEM

(71) Applicant: Bayerische Motoren Werke Aktiengesellschaft, Munich (DE)

(72) Inventors: Andreas Kern, Roth (DE); Thomas Koenigseder, Wilfling (DE); Albrecht Neff, Unterschleissheim (DE)

(73) Assignee: Bayerische Motoren Werke Aktiengesellschaft, Munich (DE)

(\*) Notice: Subject to any disclaimer, the term of this patent is extended or adjusted under 35 U.S.C. 154(b) by 198 days.

(21) Appl. No.: 16/239,375

(22) Filed: Jan. 3, 2019

(65) Prior Publication Data

US 2019/0140859 A1     May 9, 2019

Related U.S. Application Data

(63) Continuation of application No. PCT/EP2017/061014, filed on May 9, 2017.

(30) Foreign Application Priority Data

Jul. 4, 2016     (DE) .................. 10 2016 212 137.5

(51) Int. Cl.
*H04L 12/40*     (2006.01)
*G07C 5/08*     (2006.01)
(Continued)

(52) U.S. Cl.
CPC ............ *H04L 12/40* (2013.01); *B60R 16/023* (2013.01); *G07C 5/008* (2013.01); *G07C 5/085* (2013.01);
(Continued)

(58) Field of Classification Search
CPC . H04L 12/40; H04L 67/2852; H04L 12/4625; H04L 2012/40267; B60R 16/023; G07C 5/008; G07C 5/085
See application file for complete search history.

(56) References Cited

U.S. PATENT DOCUMENTS

| | | | |
|---|---|---|---|
| 6,611,755 B1* | 8/2003 | Coffee ................... | B28C 5/422 340/438 |
| 2003/0033374 A1* | 2/2003 | Horn ................. | H04L 12/40032 709/217 |

(Continued)

FOREIGN PATENT DOCUMENTS

| DE | 10 2008 047 561 A1 | 4/2010 |
|---|---|---|
| DE | 10 2010 053 955 A1 | 8/2011 |
| JP | 2007-251828 A | 7/2007 |

OTHER PUBLICATIONS

PCT/EP2017/061014, International Search Report dated Jul. 6, 2017 (Two (2) pages).

(Continued)

*Primary Examiner* — Yazan A Soofi
(74) *Attorney, Agent, or Firm* — Crowell & Moring LLP

(57) ABSTRACT

Processing signals from messages on at least two data buses, particularly CAN buses in a vehicle, includes extracting at least one signal from at least one message in a traffic node of the at least two data buses and at least one extracted signal value of the at least one signal is checked for a change relative to the signal value of the at least one signal that was most recently held in the memory unit. The at least one extracted signal value of the at least one signal is held in the memory unit if the at least one extracted signal value of the at least one signal has changed relative to the signal value of the at least one signal that was most recently held in the memory unit.

20 Claims, 1 Drawing Sheet

(51) Int. Cl.
*G07C 5/00* (2006.01)
*B60R 16/023* (2006.01)
*H04L 29/08* (2006.01)
*H04L 12/46* (2006.01)

(52) U.S. Cl.
CPC ...... *H04L 67/2852* (2013.01); *H04L 12/4625* (2013.01); *H04L 2012/40215* (2013.01); *H04L 2012/40267* (2013.01); *H04L 2012/40273* (2013.01)

(56) References Cited

U.S. PATENT DOCUMENTS

| | | | | |
|---|---|---|---|---|
| 2011/0130916 | A1* | 6/2011 | Mayer | G08G 1/127 701/31.4 |
| 2012/0004804 | A1* | 1/2012 | Beams | G01S 5/0027 701/32.7 |
| 2012/0245934 | A1* | 9/2012 | Talwar | G10L 15/22 704/235 |
| 2015/0180784 | A1* | 6/2015 | Tokutsu | H04L 12/4015 370/429 |
| 2018/0106898 | A1* | 4/2018 | Baskaran | G01S 7/4802 |
| 2018/0137071 | A1* | 5/2018 | Sturm | H04L 12/40169 |
| 2019/0385057 | A1* | 12/2019 | Litichever | G06N 3/08 |

OTHER PUBLICATIONS

German Search Report issued in German counterpart application No. 10 2016 212 137.5 dated Mar. 9, 2017, with Statement of Relevancy (Eleven (11) pages).

"UniCAN Professional", CSM GmbH, Jan. 26, 2011, www.csm-prodcuts.com, Four (4) pages.

"UniCAN 2 Professional", CSM GmbH (distributed by LabCell Ltd.), May 24, 2013, Four (4) pages.

* cited by examiner

METHOD AND APPARATUS FOR PROCESSING SIGNALS FROM MESSAGES ON AT LEAST TWO DATA BUSES, PARTICULARLY CAN BUSES; PREFERABLY IN A VEHICLE; AND SYSTEM

CROSS REFERENCE TO RELATED APPLICATIONS

This application is a continuation of PCT International Application No. PCT/EP2017/061014, filed May 9, 2017, which claims priority under 35 U.S.C. § 119 from German Patent Application No. 10 2016 212 137.5, filed Jul. 4, 2016, the entire disclosures of which are herein expressly incorporated by reference.

BACKGROUND AND SUMMARY OF THE INVENTION

The invention relates to a method and an apparatus for processing signals from messages on at least two data buses, in particular CAN buses, preferably in a vehicle, and to a corresponding system.

In modern motor vehicles, a multiplicity of different components, for example control devices and/or sensors, are connected via data buses, in particular a network of such data buses, with the result that information relating to the operation of the vehicle can be transmitted from one component to another. The vehicle is also connected to systems outside the vehicle, in particular a central computer system (backend), CE devices and/or a diagnostic computer, via data connections outside the vehicle, in particular the Internet, LTE, WLAN, Bluetooth and/or diagnostic interfaces. Examples of such data buses are the CAN (Controller Area Network) bus, Flexray, Ethernet and LIN (Local Interconnect Network) bus.

It is advantageous to store at least a certain part of the information relating to the operation of the vehicle, in particular to hold it for a certain period, since the vehicle can be monitored as a result and fault diagnoses if faults occur or else data recordings of accident events, in particular in the context of the highly automated driving mode, can be produced. Memory units, so-called data loggers, are generally provided for this purpose and store messages, which are sent via the data bus(es) connected to the memory units, at regular or irregular intervals of time.

DE 10 2010 053 955 A1 relates to a method for capturing data in motor vehicles by means of a data logging apparatus, wherein raw data are filtered, sampled and quantized with the aid of a calculation means in order to reduce the recording volume.

An object of the invention is to specify an improved method and an improved apparatus for processing signals from messages on at least two data buses, in particular CAN buses, preferably in a vehicle, and a corresponding system. In particular, the method and the apparatus are intended to efficiently hold the information relating to the operation of a vehicle.

This object is achieved by the method and the apparatus for processing signals from messages on at least two data buses, in particular CAN buses, preferably in a vehicle, and the corresponding system according to the independent claims. The dependent claims relate to advantageous embodiments.

According to a first aspect of the invention, in a method for processing signals from messages on at least two data buses, in particular CAN buses, preferably in a vehicle, at least one signal is extracted from at least one message in a traffic node (gateway) of the at least two data buses, that is to say a connection point between the at least two data buses, and a memory unit is checked for held signal values of the at least one signal. In particular, at least one extracted signal value of the at least one signal is checked for a change in comparison with that signal value of the at least one signal which was last held in the memory unit, and the at least one extracted signal value of the at least one signal is held in the memory unit if the at least one extracted signal value of the at least one signal has changed in comparison with that signal value of the at least one signal which was last held in the memory unit.

According to a second aspect of the invention, an apparatus for processing signals from messages on at least two data buses, in particular CAN buses, preferably in a vehicle, according to the first aspect of the invention, has an interface for connecting the apparatus to the at least two data buses in a traffic node (gateway), and a memory unit set up to hold at least one signal value of at least one signal. In addition, a computing device is provided and is set up to extract at least one signal from at least one message which is transmitted on at least one of the at least two data buses and to check the memory unit for held signal values of the at least one signal, in particular to check the at least one extracted signal value of the at least one signal for a change in comparison with that signal value of the at least one signal which was last held in the memory unit. The computing unit is also set up to transmit the at least one extracted signal value of the at least one signal to the memory unit, in particular to hold it, that is to say store it, in the latter, on the basis of the check in comparison with that signal value of the at least one signal which was last held in the memory unit.

According to a third aspect of the invention, a system for processing signals from messages on at least two data buses, in particular CAN buses, preferably in a vehicle, according to the first aspect of the invention, has at least two apparatuses according to the second aspect of the invention, wherein the at least two apparatuses are provided in at least two different traffic nodes (gateways) of at least three data buses.

The invention is based, in particular, on the approach of checking the content of messages in a traffic or connection node (so-called gateway) of a data bus system in a vehicle, in particular between at least two data buses, for the information content of a signal which is at least part of these messages and holding or storing the signal value of the signal in a memory unit on the basis of the determined information content. In other words, the signal value extracted from a message is held in the memory unit only when it contains or represents or specifies new information relating to the operation of the vehicle. The information content of a signal is checked by comparing the signal value of the signal with signal values of the same signal which are already held in the memory unit, in particular the signal value last held, that is to say it is determined, in particular, whether the extracted signal value of the signal has changed in comparison with, that is to say with respect to, the last held signal value of the signal. If the extracted signal value of the signal has not changed substantially in comparison with the last held signal value of the signal, the signal does not provide any new information, with the result that the extracted signal value of the signal does not need to be held.

A signal extracted from a message can also have more than one signal value, in particular a sequence or a progression of signal values, with the result that a sequence or a progression of extracted signal values, in particular, is compared with signal values of the signal which are held in the memory unit, in particular a held sequence or a held progression of signal values of the signal, when checking the information content of the signal. In other words, it is determined, in particular, whether there is a change in the sequence or the progression of signal values relative to, that is to say with respect to, the sequence or the progression of last held signal values of the signal, with the result that, if this is the case, the more than one signal value, in particular the sequence or the progression of signal values, is held in the memory unit.

As a result, a signal or its signal value distributed among a plurality of data buses and/or contained in different messages (Protocol Data Unit, PDU) must advantageously be stored only once. In communication methods such as "Publish/Subscribe", senders/recipients can additionally be stored if necessary. In contrast to recording the same signal value many times, in particular for each bus to which the signal is copied, the signal value can therefore be recorded only once.

Overall, the invention makes it possible to efficiently hold information relating to the operation of the vehicle.

A signal value in the sense of the invention can also relate to the presence of a signal in a message, in particular at a particular time. If the signal value has not changed but has nevertheless been received or transmitted again, a note, in particular a flag or a counter, indicating the transmission or reception of the signal value and/or the transmission or reception frequency can accordingly be held.

All signals contained in a message are preferably extracted and the corresponding signal values for each of these signals are compared with already held signal values of the respective signals, that is to say the memory unit is checked for held signal values, in particular last held signal values, of each of these signals, and all of those signal values of the signals for which a change with respect to, that is to say in comparison with, the held signal values of the respective signals is determined are held in the memory unit.

More preferably, the selection of the signals or signal values to be held is configurable and can preferably depend on activation states of vehicle functions or functions outside the vehicle, in particular backend services, and/or on operating states of the vehicle or devices connected to the vehicle in a wired or wireless manner, in particular a diagnostic tester and/or a smartphone.

Holding signal values in the sense of the invention relates to the storage or filing of signal values in a memory unit. In particular, the held signal values can be accessed at a later time, that is to say the memory unit can be read and the signal values which are read can be processed further.

The practice of checking at least one extracted signal value of a signal for a change in comparison with a signal value of the signal last held in the memory unit in the sense of the invention also relates to the practice of checking the memory unit for this signal, that is to say for held signal values of the signal. In particular, the checking also relates to the determination of whether at least one signal value of the signal is already held in the memory unit. The at least one extracted signal value of a signal is preferably also held in the memory unit when no signal value of this signal has previously been held in the memory unit.

In one preferred embodiment, the message or the signal contained in the message or its at least one signal value is generated by the traffic node or a data bus subscriber, in particular a control device, which is part of the traffic node. In an alternative embodiment, the message or the signal contained in the message or its at least one signal value is generated by a data bus subscriber, in particular a control device, wherein the traffic node is part of the data bus subscriber. In particular, the traffic node itself is a data bus subscriber.

In another preferred embodiment, the memory unit has, for the purpose of holding the at least one extracted signal, a ring memory which holds a history of the at least one extracted signal value of the at least one signal. In this case, the ring memory preferably has storage space for a predefined number of extracted signal values of the signal, that is to say the ring memory can hold a predefined number of extracted signal values of the signal. In this case, the ring memory preferably operates according to the "first in, first out" principle, that is to say if the predefined number of extracted signal values of the signal is held in the ring memory and at least one further signal value of the signal is intended to be held in the ring memory according to the method for processing signals from messages on at least two data buses in a vehicle, the (oldest) signal value held in the ring memory first, that is to say for the longest time, is overwritten with the further signal value. This ensures that a history, that is to say a sequence of signal values over a particular period, is always up-to-date in the ring memory and can be retrieved, that is to say read, from the latter.

In another preferred embodiment, the length of the history of the at least one extracted signal value, that is to say the number of held signal values, of the at least one signal or the storage space of the ring memory available to the held signal values of the signal depends on the at least one signal. For example, the predefined number of signal values of a first signal which can be held in the ring memory differs from the predefined number of signal values of a second signal which can be held in the ring memory. A different predefined number of signal values of the respective signals can preferably be respectively held in the ring memory for a plurality of signals. This is particularly advantageous and efficient if, in particular for fault diagnosis, a long history of some signals is required and only a short history of other signals is required.

As a result of the history of some signals, in particular signals which do not have a high priority, being restricted, the recording of information relating to the operation of the vehicle becomes particularly efficient and storage space in the ring memory is saved.

In another preferred embodiment, the at least one extracted signal value of the at least one signal is held in the memory unit only if it has changed by more than a predefined threshold value in comparison with that signal value of the at least one signal which was last held in the memory unit. The predefined threshold value is preferably greater than a noise of the signal, that is to say a (statistical) fluctuation of the signal value of the signal. This ensures that only signal values of signals with new information content are recorded, that is to say held in the memory unit.

Further preferably, the predefined threshold value is selected in such a manner that a small change in the at least one extracted signal value of the at least one signal in comparison with that signal value of the at least one signal which was last held in the memory unit does not cause the at least one extracted signal value to be held, in particular if the change is so small that it is of no use in a fault diagnosis. This avoids unnecessary recording of signal values.

The predefined threshold value can also preferably correspond to a minimum interval of time which must be between the extracted signal value and the signal value last held in the memory unit so that the extracted signal value is held. For example, this can restrict the holding of the vehicle speed of the vehicle to intervals of 2 seconds. This ensures that the volume of data to be held does not become too large, in particular if the signal values to be held follow one another closely in terms of time.

In another preferred embodiment, only predefined signal values of a signal can be provided for holding. If the signal value of a signal indicates, in particular, a state which is fundamentally of no interest to a recording, this signal value is preferably not held. Further preferably, only predefined changes in a signal value of a signal, which describes a state, can also be provided for holding. For example, a signal value which relates to the activation state of an alarm system could be held only when the signal value changes from inactive to active.

In another preferred embodiment, an item of time information relating to the time at which the at least one signal was extracted from the at least one message and/or an item of message information relating to at least one message which was used to send the at least one signal and/or an item of data bus information relating to the at least one data bus on which the message having the at least one signal was sent is/are determined for the at least one extracted signal value of the at least one signal and is/are held together with the at least one extracted signal value of the at least one signal. The at least one extracted signal value of the at least one signal is preferably stored in a database in the memory unit together with an item of additional information, in particular the time information and/or the message information and/or the data bus information and/or the addressee information, that is to say the sender and/or recipient of a message, in particular in the case of publish/subscribe or request/response message patterns (message exchange patterns), with the result that the additional information relating to the held signal values can be accessed in a particularly simple manner. Further preferably, the database has a pointer structure, with the result that the at least one extracted signal value of the signal and its additional information can be held in the memory unit in a particularly efficient and reliable manner.

On the basis of the time information which is preferably held with the signal values of the signal, it is possible, in particular, to determine or ascertain the age of the respective signal value. As a result, in particular if the memory unit is in the form of a ring memory, it is possible to determine in a particularly reliable manner which signal value is intended to be overwritten next with a further, extracted signal value. In addition, the time information can be advantageously used when creating a fault diagnosis since it is possible to easily determine at what time which signal has assumed which signal value or which information relating to the operation of the vehicle was available at what time for the data bus subscribers in the data bus system comprising the at least two data buses with the data bus sub scribers.

On the basis of the message information which is preferably held with the signal values of the signal, it is possible, in particular, to determine the sender and/or the recipient of the message, in particular various components of the vehicle or data bus subscribers such as control devices and/or sensors, from which or to which the message was sent. As a result, during a fault diagnosis, it is advantageously possible to determine which data bus subscribers have (recently) changed the signal values held in the memory unit and which further signal values were contained in the messages.

On the basis of the data bus information which is preferably held with the signal values of the signal, it is possible, in particular, to determine on which of the different data buses information relating to the operation of the vehicle was transmitted. As a result, during a fault diagnosis, it is possible to easily determine which of the data bus subscribers connected only to one data bus or not connected to all data buses had access to a particular signal and its signal value(s).

In one preferred embodiment, the additional information, in particular the time information and/or the message information and/or the data bus information and/or the addressee information, is held even if the signal value is not or cannot be held. This is advantageous, in particular, for creating fault reports in which, for example, only the time at which a signal is transmitted or received plays a role, but not the specific signal value.

In another preferred embodiment, the extracted signal value is held only if the change in an item of additional information to likewise be held with respect to the last held additional information has reached or exceeded a predefined threshold value.

In another preferred embodiment, the extracted signal value is held only if the additional information satisfies a predefined condition. In particular, the extracted signal value is held only if the message is or was addressed to a predefined recipient and is or was sent by a predefined sender.

In another preferred embodiment, signal values of the at least one signal which are held in the memory unit are quantized on the basis of the time information assigned to them.

"Quantization" in the sense of the invention relates to the resolution, in particular of a range of values of the signal or its signal values, and/or the time resolution of signal values, in particular in the memory unit. In other words, the sequence of values and/or time sequence of the signal values held in the memory unit, that is to say how accurately the signal values are held and/or how closely the signal values follow one another in terms of time, is/are stipulated or determined or indicated by the quantization of signal values.

The quantization preferably causes the time sequence of new held signal values to be close and the time sequence of old signal values to be far, that is to say new held signal values are close together in terms of time and old held signal values are far apart in terms of time. This is advantageous, in particular, if the held signal values are intended to be used to extrapolate a development in which signal values held last are given a higher weighting, or the development of signal values held last is determined, in particular. The quantization means, in particular, that signal values can be held more efficiently. The quantization further preferably results in the resolution of new held signal values being high and the resolution of old signal values being low, that is to say the value of a new held signal value has a lower uncertainty than the value of an old signal value.

Both the resolution of the signal values, that is to say their accuracy or precision, and their temporal resolution, that is to say their time resolution, can preferably be quantized on the basis of the time information assigned to them. Further preferably, new signal values are held with high precision in a fast clock sequence, in particular in the milliseconds range, in particular by allocating a lot of storage space, preferably 16 bits, particularly preferably 32 bits, in particular 64 bits, in the ring memory to each new signal value. Older and/or old signal values which have already been held for a relatively long time in the memory unit are held at longer intervals of time, in particular in the seconds or minutes range, with simultaneously low precision, in particular by reducing the storage space allocated to the older and/or old signal values, preferably to 8 bits, particularly preferably 4 bits, in particular 2 bits.

In another preferred embodiment, the quantization of predefined signal values can be suspended or at least influenced, in particular attenuated, for a predefined period. As a result, at least one older signal value which has already been held for a relatively long time in the memory unit can be held with high precision and can closely follow the preceding signal value in terms of time or can be shortly before the subsequent signal value in terms of time even though further preceding or subsequent signal values are held only with low precision at longer intervals in terms of time. The quantization is preferably suspended when a predefined event, for example a strong acceleration which indicates an accident, is captured by a control device. In order to have many data items available for analysis at the time of the predefined event, the quantization is suspended or at least attenuated for the predefined period, in particular several seconds, with the result that the signal values represent the vehicle state with high accuracy in the predefined period. The signal values are then held again with the original quantization, for example if the strong acceleration has not turned out to be an accident, since the vehicle accelerates again and/or accelerates further.

The quantization can preferably be influenced depending on the predefined event, that is to say different events, in particular events captured by a control device, cause differently strong or weak quantization for different periods. As a result, the holding of data becomes particularly flexible.

In another preferred embodiment, the at least one extracted signal value of the at least one signal is held in the memory unit only if the time information relating to that signal value of the at least one signal which was held last and the determined time information relating to the at least one extracted signal value of the at least one signal exceed a predefined period, that is to say if a predefined period has elapsed between the time at which the signal is extracted and the time at which that signal value of this signal which was held last in the memory unit is held. This avoids, in particular, sequences or progressions of signal values which are close in terms of time being recorded, with the result that the signal values held in the memory unit form a long history, that is to say old signal values can also be accessed in the memory unit.

The predefined period preferably differs for different signals, that is to say the signal values of different signals are held in the memory unit at respectively different intervals of time. As a result, the length of the history of a signal can be selected, in particular, on the basis of the change rate of the corresponding signal values.

In another preferred embodiment, the at least one extracted signal value of the at least one signal is compressed by means of a compression method, in particular by means of runlength encoding or compression by means of approximation using mathematical functions or algorithms or another similar method known from the prior art, before being held in the memory unit. As a result, the signal values held in the memory unit preferably require less storage space if the information content remains the same.

In another preferred embodiment, the signal values of the at least one signal which are held in the memory unit are compressed using at least one lossy compression method on the basis of the time information assigned to them, wherein older signal values of the at least one signal which are held in the memory unit are compressed more strongly. This is particularly advantageous if, in particular during a fault diagnosis, a development of the signal is determined by means of an extrapolation, wherein the development of the signal depends decisively on the last held signal values, with the result that the loss of information in the case of strong compression of older signal values does not play a substantial role.

The lossy compression preferably relates not only to video and/or audio transmissions on data buses, but also to signals. For example, a reduction in the accuracy of the speed information on the basis of the age of the speed information may be preferred. Therefore, all speed signals recorded in the last 10 minutes are held in the ring memory without compression. The speed signals already held in the ring memory for 10 to 20 minutes are moderately compressed, with the result that the accuracy of the held signals falls to 2 km/h. If the signals held in the ring memory are older than 20 minutes, stronger compression is accordingly carried out, in particular using the ZIP algorithm or the RLE algorithm, with the result that the accuracy of the signals falls further to 10 km/h.

In another preferred embodiment, the predefined threshold value and/or the temporal resolution of the quantization and/or the predefined period and/or the compression method and/or parameters of the compression method and/or the assignment of the compression method and/or of the parameters of the compression method to the time information relating to the at least one extracted signal value and/or the held signal values of the at least one signal is/are selected by a user or configured by a control device. As a result, the user or the control device can directly control the length of the history and/or the quality, that is to say the resolution and/or the scope, of different signals and can thus stipulate, in particular, which of the signals required for a fault diagnosis, for example, are present in what quality, that is to say resolution and/or scope, in the memory unit. The user is preferably the driver of the vehicle or the service personnel servicing the vehicle.

In another preferred embodiment, signal values of different signals held in the memory unit are combined on the basis of the time value respectively assigned to them to form a new signal value of a new signal and are held in the memory unit. For example, the opening state of four individual doors of the vehicle can be combined to form an opening state of the vehicle. As a result, current information relating to the operation of the vehicle can be held in a more detailed manner, in particular, than older information which relates to the operation of the vehicle and no longer plays a major role, in particular during a fault analysis. This can be provided, in particular, by means of predefined algorithms, in particular by conversion rules or software plug-ins in a gateway.

In addition, provision may be made for only predefined signals or their signal values or only signals to be held in the memory unit above a predefined age on the basis of their additional information, in particular the bus on which the message was transmitted or received and/or the sender and/or the recipient.

In another preferred embodiment, signal values of predefined signals held in the memory unit are transferred to a further memory unit, in particular to an additional storage medium, for example a hard disk, an accident recorder or else wirelessly to an external data processing center (so-called backend). This transfer or transmission is preferably carried out when the storage space of the memory unit is completely or virtually completely full, that is to say no or virtually no further extracted signal values of at least one signal can be held in the memory unit without having to overwrite or delete signal values of the at least one signal which are already held in the memory unit. As a result, particularly long histories of the signals can be generated in the further memory unit.

In one preferred embodiment of the second aspect of the invention, the computing device is set up, on the basis of a request from a user and/or a data bus subscriber, in particular a control device, to transmit the history and/or a part of the history of the held signal values of a signal from the memory unit to an output device and/or a central computer system and/or an external data memory and/or the control device with particular compression and/or quantization. For this purpose, a user can preferably input such a request on an input device which may be, in particular, a part of the apparatus for processing signals from messages on at least two data buses in a vehicle or is connected to an interface of the apparatus. Further preferably, the output device may be in the form of a portable storage medium which is connected to an interface of the apparatus, or a wireless storage medium which is connected to the apparatus via a wireless connection, in particular a central computer system. As a result, the user and/or the data bus subscriber can have signal values of a signal which are held in the memory unit and are required, in particular, for a particular fault diagnosis and/or the initialization of the data bus subscriber or a further data bus subscriber deliberately output or transmitted with a certain quality, that is to say with a particular resolution and in a particular scope.

The computing device is preferably set up to transmit the history of a signal from the memory unit to a control device if the latter is restarted and is intended to be initialized with at least one held signal value of the signal. Further preferably, the computing device is set up to transmit the history of a signal from the memory unit to a control device which changes from an inactive mode, in particular an energy-saving mode or in the case of a reset, to an active mode and requires an item of information which relates to the operation of the vehicle and is present or is provided by at least one held signal value of the signal.

In one preferred embodiment of the third aspect of the invention, one of the at least two apparatuses is set up to synchronize the signal values held in the memory units of the at least two apparatuses, with the result that the signal values of identical signals held in the at least two memory units correspond. As a result, all memory units included in the system have current information relating to the operation of the vehicle. The situation in which a data bus subscriber, in particular a control device, receives only out-of-date signal values of a signal on account of a request to a particular apparatus is reliably avoided. This is advantageous, in particular, when not all apparatuses have access to all signals or their signal values to be held.

In another preferred embodiment, different apparatuses may hold different subsets of signals or their signal values, with the result that the signal values to be held are divided among the apparatuses. This advantageously makes it possible to save storage space in at least one of apparatuses. The apparatuses are preferably set up, in the event of a request for a signal or a history of the signal or its signal values, to in turn request and/or forward the signal or its history from the at least one other apparatus.

The apparatuses may preferably be configured differently with respect to the implemented configuration properties, in particular with respect to the quantization and/or the compression and/or the history lengths of the various signals and/or of the signals to be held on the basis of the sender or the recipient and/or the buses on which the message is or was transmitted, etc. In this case, the configuration of the apparatuses may either be firmly predefined or may be respectively proportionately formed or requested by individual components of the vehicle, in particular control devices, and/or a central computer system (backend). As a result, individual control devices in the vehicle and/or functions in the vehicle and/or functions in the central computer system, in particular, can explicitly request the holding of particular signals. In addition, operating or functional states can be monitored by the apparatuses and preset configurations can be activated or deactivated on the basis of the operating or functional states.

The at least two apparatuses are preferably set up to receive requests for particular signals or signal values held in their respective memory units. The apparatuses are also preferably set up to stipulate among one another which signals or signal values are held by which apparatus or which signals or signal values are transmitted to another apparatus for the purpose of holding.

At least two apparatuses can preferably be designed to combine data, in particular signal values, from their respective memory units and to anonymize or encrypt said data using particular algorithms, in particular, and/or to provide said data with a fingerprint and therefore protect said data from subsequent manipulation. Data protection requirements can be met in a particularly simple manner as a result. In addition, the data combined in this manner can be used as evidence.

In one preferred embodiment, the at least two apparatuses are arranged in the vehicle. Alternatively, at least one apparatus or at least one part of at least one apparatus, in particular the memory unit, is arranged outside the vehicle, in particular in a data memory connected to the vehicle electrical system or in a central computer system connected via the Internet or a data connection. As a result, a particularly large amount of storage space is available, with the result that long histories of the signals or signal values can also be held.

In one preferred embodiment, the signals are only extracted and possibly anonymized and/or encrypted in the vehicle, whereas the checking and holding are carried out in a system outside the vehicle, in particular a central computer system.

In another preferred embodiment, one of the at least two apparatuses can be arranged in the vehicle and another of the at least two apparatuses can be arranged in a system outside the vehicle. In this case, synchronization between the at least two apparatuses preferably takes place. In particular, predefined signals are transmitted in this case to an apparatus arranged in the central computer system, where longer histories can be held and transmitted back to the vehicle if necessary.

In another preferred embodiment, the computing devices of the at least two apparatuses are set up to detect system states in which at least one data bus subscriber, in particular a control device, requires a history and/or a part of the history of the held signal values of a signal with particular compression and/or quantization and to transmit the history and/or a part of the history of the held signal values of a signal to the at least one data bus subscriber with particular compression and/or quantization. In particular, the computing devices of the at least two apparatuses are set up to transmit at least one signal value of at least one signal held in a memory unit to at least one data bus subscriber if the latter has been restarted and requires current information relating to the operation of the vehicle, in particular the last held signal value of a signal, for initialization. Further preferably, the computing devices of the at least two apparatuses are set up to transmit at least one signal value of at least one signal held in a memory unit to at least one data bus subscriber if the latter is transferred from an in active mode, in particular an energy-saving mode or in the case of a reset, to an active mode and in the process requires current information relating to the operation of the vehicle, in particular the last held signal value of a signal.

The features and advantages described with respect to the first aspect of the invention and its advantageous configuration also apply to the second and third aspects of the invention and their advantageous configuration and vice versa.

Further features, advantages and possible applications of the invention emerge from the following description in connection with the figures, in which, in an at least partially schematic manner:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
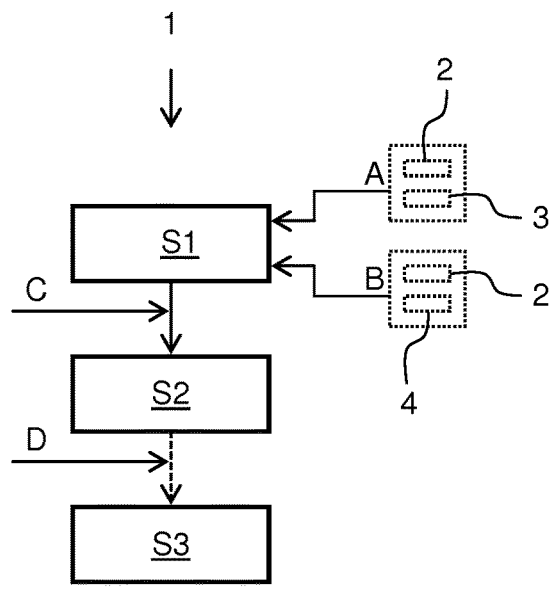
FIG. 1 shows an exemplary embodiment of a method for processing signals from messages on at least two data buses in a vehicle.

FIG. 1 shows an exemplary embodiment of a method 1 for processing signals 2, 3, 4 from messages A, B on at least two data buses in a vehicle.

In a first step S1, the schematically illustrated signals 2, 3, 4 are extracted from the messages A, B, for example by applying a filter or analyzing a header of the messages A, B and reading, in particular parts of the message, in a targeted manner, in particular bit by bit. In the example illustrated in FIG. 1, a first message A, which contains or comprises a first signal 2 and a second signal 3, and a second message B, which contains or comprises the first signal 2 and a third signal 4, are depicted.

In a second step S2, at least one signal value of each of the extracted signals 2, 3, 4 is compared with signal values of the respective signals 2, 3, 4 held in a memory unit, in particular the last held signal value. It is preferably determined, in particular checked, whether there is a change in the at least one signal value of each of the extracted signals 2, 3, 4 in comparison with that signal value of the respective signals 2, 3, 4 which was last held in the memory unit.

In one preferred embodiment, the signal values can be checked on the basis of, that is to say considering, a condition C. The condition C can cause, for example, the signal values to be checked only when a predefined period has elapsed since the last checking operation.

Alternatively or additionally, the condition C can cause only extracted signal values of predefined signals, for example only of the first signal 2 and of the third signal 4, to be checked for a change in comparison with those signal values of the predefined signals which were last held in the memory unit.

In another preferred embodiment, the condition C is input by a user via an input device which may be in the form of a data bus subscriber. Alternatively or additionally, the condition C is generated and/or transmitted by a data bus subscriber, for example a control device.

In a third step S3, the extracted signal values of the signals 2, 3, 4 are held in the memory unit if they have changed in comparison with those signal values of the respective signals 2, 3, 4 which are held in the memory unit. This condition is indicated by the dashed arrow.

In another preferred embodiment, the holding of the extracted and checked signal values can be influenced by a condition D. The condition D can cause, for example, the extracted signal value of each of the signals 2, 3, 4 to be held in the memory unit only when its change in comparison with that signal value of the respective signal 2, 3, 4 which was last held in the memory unit exceeds a predefined threshold value, that is to say differs by more than the threshold value from that signal value of the respective signal 2, 3, 4 which was last held in the memory unit. In particular, the predefined threshold value may differ for each of the signals 2, 3, 4. For example, a first threshold value is predefined for the first signal 2, a second threshold value is predefined for the second signal 3 and a third threshold value is predefined for the third signal 4, for example by a user and/or a data bus subscriber, in particular a control unit. As a result, the holding of the extracted signal values of each of the signals 2, 3, 4 can be adapted to the respective signal 2, 3, 4, in particular to its noise or its (statistical) fluctuation.

Alternatively or additionally, the condition D can also relate to compression of the signal values to be held by means of a compression method and/or the parameters of the compression method.

Figure 2:
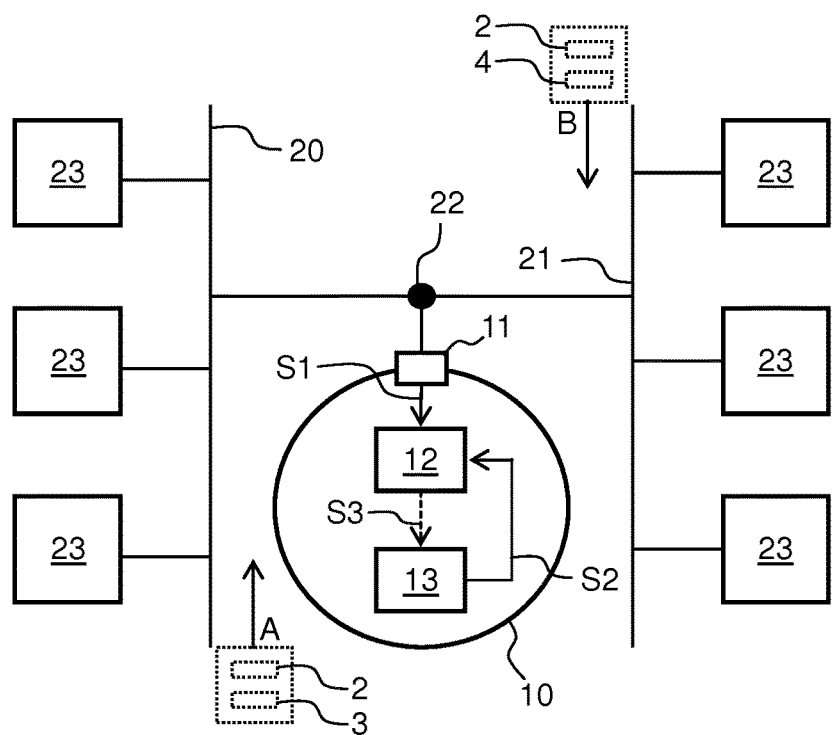
FIG. 2 shows an exemplary embodiment of an apparatus for processing signals from messages on at least two data buses in a vehicle.

FIG. 2 shows an exemplary embodiment of an apparatus 10 for processing signals 2, 3, 4 from messages A, B on at least two data buses 20, 21 in a vehicle. The apparatus 10 is arranged at a traffic node 22 (gateway), in which the first data bus 20 and the second data bus 21 are connected, or is connected to this traffic node 22 via an interface 11, with the result that both a message A, which is transmitted via the first data bus 20, and a message B, which is transmitted via the second data bus 21, can be processed. In one embodiment, the apparatus 10 forms the traffic node 22, that is to say the two data buses 20, 21 are directly connected to the apparatus 10 via the interface 11.

The messages A, B are generated or sent and/or received by data bus subscribers 23, in particular control devices and/or sensors and/or input or output apparatuses, by means of which or with the aid of which a user can communicate with the data bus subscribers 23, in particular with the apparatus 10. The messages A, B contain or comprise at least one signal 2, 3, 4 which can assume, that is to say can have or comprise, one or more signal values, in particular a sequence or a progression of signal values. The at least one signal 2, 3, 4 or its signal value(s) may be, for example, an item of control information or preprocessed data, in particular from a sensor. In particular, the at least one signal 2, 3, 4 or its signal value(s) represent(s) an item of information relating to the operation of the vehicle.

In a similar manner to FIG. 1, the first message A contains the first signal 2 and the second signal 3 and the second message B contains the first signal 2 and the third signal 4 in the present example.

In particular, when passing the traffic node 22, the messages A, B are available for access by the apparatus 10. In particular, a computing device 12 can extract the signals 2, 3, 4 from the messages A, B (first step S1) via the interface 11 and can compare their respective signal values with signal values of the respective signals 2, 3, 4 held in a memory unit 13 (second step S2).

In particular, the computing device 12 checks or determines whether there is a change in the extracted signal value of each of the signals 2, 3, 4 in comparison with that signal value of the respective signal 2, 3, 4 which is held in the memory unit 13. If this is the case, the computing device 12 transfers that signal value of each of the signals 2, 3, 4 which has changed in comparison with that signal value of the respective signal 2, 3, 4 which is held in the memory unit 13 to the memory unit 13 (third step S3). In particular, this signal value of each of the signals 2, 3, 4 is stored of filed, that is to say held, in the memory unit 13 and is therefore available in the event of a request, that is to say in the event of the memory unit 13 being accessed by the user or a data bus subscriber 23, in particular for the purpose of creating a fault diagnosis if a fault occurs and/or initializing a data bus subscriber 23.

If, in the example illustrated, message A is processed by the apparatus 10 at a first time, that is to say the signals 2, 3 are extracted and their signal values are held in the memory unit 13, and message B is processed by the apparatus 10 at a second, subsequent time, a check is carried out, in particular, in order to determine whether that signal value of the first signal 2 which was held in the memory unit 13 at the first time has changed in comparison with that signal value of the first signal 2 which was extracted from the message B at the second time. If the two signal values correspond, that signal value of the first signal 2 which was extracted from the message B at the second time does not need to be held since there is no new information relating to the operation of the vehicle in this case.

LIST OF REFERENCE SIGNS, IF NECESSARY

1 Method for processing signals from messages on at least two data buses in a vehicle
2 First signal
3 Second signal
4 Third signal
10 Apparatus for processing signals from messages on at least two data buses in a vehicle
11 Interface
12 Computing device
13 Memory unit
20 First data bus
21 Second data bus
22 Traffic node (gateway)
23 Data bus subscriber
A First message
B Second message
C First condition
D Second condition
S1 Extract at least one signal from at least one message
S2 Check at least one extracted signal value
S3 Hold the at least one signal value The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing signals from messages on at least two data buses in a vehicle, the method comprising:
   extracting at least one signal from at least one message in a traffic node of the at least two data buses;
   checking at least one extracted signal value of the at least one signal for a change in comparison with a signal value of the at least one signal last held in a memory unit; and
   holding the at least one extracted signal value of the at least one signal in the memory unit if the at least one extracted signal value of the at least one signal has changed in comparison with that signal value of the at least one signal which was last held in the memory unit.

2. The method as claimed in claim 1, wherein the memory unit comprises a ring memory which holds a history of the at least one extracted signal value of the at least one signal.

3. The method as claimed in claim 2, wherein the length of the history of the at least one extracted signal value of the at least one signal depends on the at least one signal.

4. The method as claimed in claim 1, wherein the at least one extracted signal value of the at least one signal is held in the memory unit only if the at least one extracted signal value has changed by more than a predefined threshold value in comparison with that signal value of the at least one signal which was last held in the memory unit.

5. The method as claimed in claim 3, wherein the at least one extracted signal value of the at least one signal is held in the memory unit only if the at least one extracted signal value has changed by more than a predefined threshold value in comparison with that signal value of the at least one signal which was last held in the memory unit.

6. The method as claimed in claim 1, wherein an item of time information relating to a time at which the at least one signal was extracted and/or an item of message information relating to at least one message which was used to send the at least one signal and/or an item of data bus information relating to the at least one data bus on which the message having the at least one signal was sent is/are determined for the at least one extracted signal value of the at least one signal and is/are held together with the at least one extracted signal value of the at least one signal.

7. The method as claimed in claim 5, wherein signal values of the at least one signal which are held in the memory unit are quantized on the basis of the time information assigned to corresponding ones of the at least one signal.

8. The method as claimed in claim 6, wherein the at least one extracted signal value of the at least one signal is held in the memory unit only if the time information relating to that signal value of the at least one signal which was held last and the determined time information relating to the at least one extracted signal value of the at least one signal exceed a predefined period.

9. The method as claimed in claim 7, wherein the at least one extracted signal value of the at least one signal is held in the memory unit only if the time information relating to that signal value of the at least one signal which was held last and the determined time information relating to the at least one extracted signal value of the at least one signal exceed a predefined period.

10. The method as claimed in claim 6, wherein the signal values of the at least one signal which are held in the memory unit are compressed using at least one lossy compression method on the basis of the time information assigned to them, wherein older signal values of the at least one signal which are held in the memory unit are compressed more strongly.

11. The method as claimed in claim 7, wherein the signal values of the at least one signal which are held in the memory unit are compressed using at least one lossy compression method on the basis of the time information assigned to them, wherein older signal values of the at least one signal which are held in the memory unit are compressed more strongly.

12. The method as claimed in claim 8, wherein the signal values of the at least one signal which are held in the memory unit are compressed using at least one lossy compression method on the basis of the time information assigned to them, wherein older signal values of the at least one signal which are held in the memory unit are compressed more strongly.

13. The method as claimed in claim 4, wherein the predefined threshold value and/or the temporal resolution of the quantization and/or the predefined period and/or the compression method and/or parameters of the compression method and/or the assignment of the compression method and/or of the parameters of the compression method to the time information relating to the at least one extracted signal value and/or the held signal values of the at least one signal is/are selected by a user.

14. The method as claimed in claim 7, wherein the predefined threshold value and/or the temporal resolution of the quantization and/or the predefined period and/or the compression method and/or parameters of the compression method and/or the assignment of the compression method and/or of the parameters of the compression method to the time information relating to the at least one extracted signal value and/or the held signal values of the at least one signal is/are selected by a user.

15. The method as claimed in claim 1, wherein signal values of different signals held in the memory unit are combined based on the time value respectively assigned to said signals held in memory to form a new signal value of a new signal held in the memory unit.

16. An apparatus configured to processing signals from messages on at least two data buses in a vehicle, wherein the apparatus comprises:
   an interface configured to connect the apparatus to the at least two data buses in a traffic node;
   a memory unit configured to hold at least one signal value of at least one signal;
   a computing device configured to:
      extract at least one signal from at least one message which is transmitted on at least one of the at least two data buses,
      check the at least one extracted signal value of the at least one signal for a change in comparison with that signal value of the at least one signal which was last held in the memory unit, and
      transmit the at least one extracted signal value of the at least one signal to the memory unit based on said check in comparison with that signal value of the at least one signal which was last held in the memory unit.

17. The apparatus as claimed in claim 16, wherein the computing device is configured, based on a request from a user and/or a data bus subscriber, to transmit the history and/or a part of the history of the held signal values of a signal from the memory unit to an output device and/or a central computer system and/or an external data memory and/or the data bus subscriber with particular compression and/or quantization.

18. A system for processing signals from messages on at least two data buses in a vehicle having at least two apparatuses which are provided in at least two different traffic nodes of at least three data buses, wherein each of the at least two apparatus comprises:
   an interface configured to connect the apparatus to the at least three data buses in a traffic node;
   a memory unit configured to hold at least one signal value of at least one signal;
   a computing device configured to:
      extract at least one signal from at least one message which is transmitted on at least one of the at least three data buses,
      check the at least one extracted signal value of the at least one signal for a change in comparison with that signal value of the at least one signal which was last held in the memory unit, and
      transmit the at least one extracted signal value of the at least one signal to the memory unit based on said check in comparison with that signal value of the at least one signal which was last held in the memory unit.

19. The system as claimed in claim 18, wherein one of the at least two apparatuses is configured to synchronize the signal values held in the memory units of the at least two apparatuses, with the result that the signal values of identical signals held in the at least two memory units correspond.

20. The system as claimed in claim 18, wherein the computing devices of the at least two apparatuses are configured to detect system states in which at least one data bus subscriber requires a history and/or a part of the history of the held signal values of a signal with particular compression and/or quantization and to transmit the history and/or a part of the history of the held signal values of a signal to the at least one data bus subscriber with particular compression and/or quantization.

* * * * *